Sept. 12, 1939.　　　G. T. BIRDSALL　　　2,172,343
HAT MAKING MACHINE
Filed Nov. 8, 1937　　　7 Sheets-Sheet 1
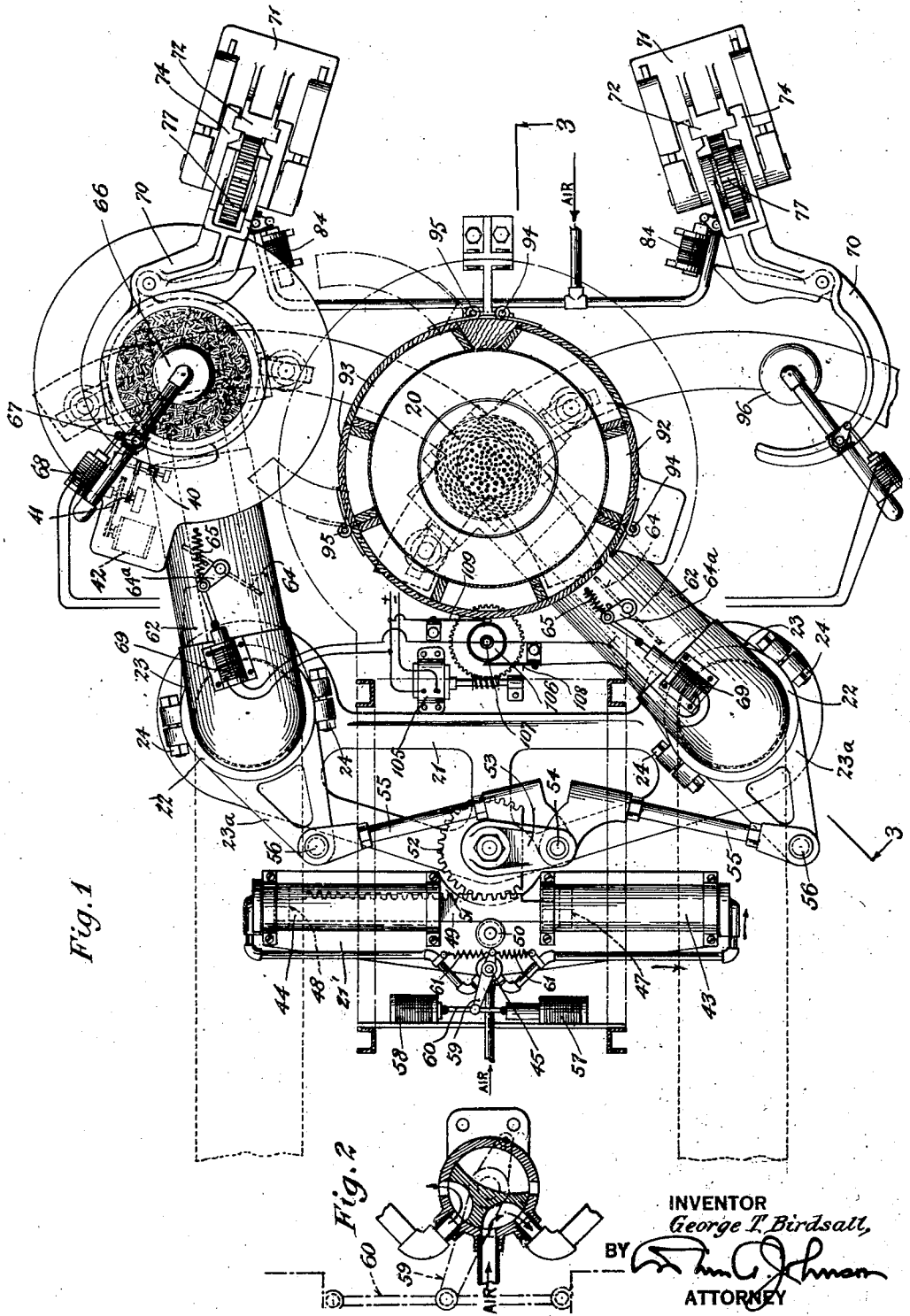
Fig.1
Fig.2
INVENTOR
*George T. Birdsall,*
BY 
ATTORNEY Sept. 12, 1939.   G. T. BIRDSALL   2,172,343
HAT MAKING MACHINE
Filed Nov. 8, 1937   7 Sheets-Sheet 2
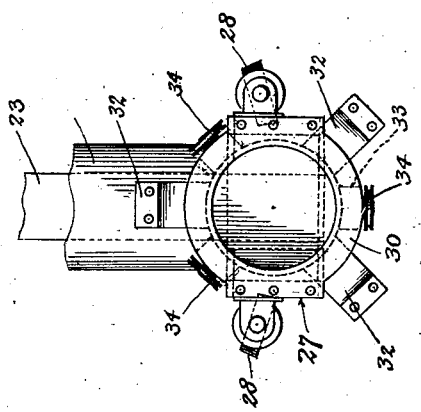
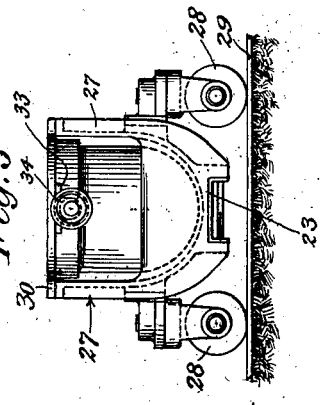
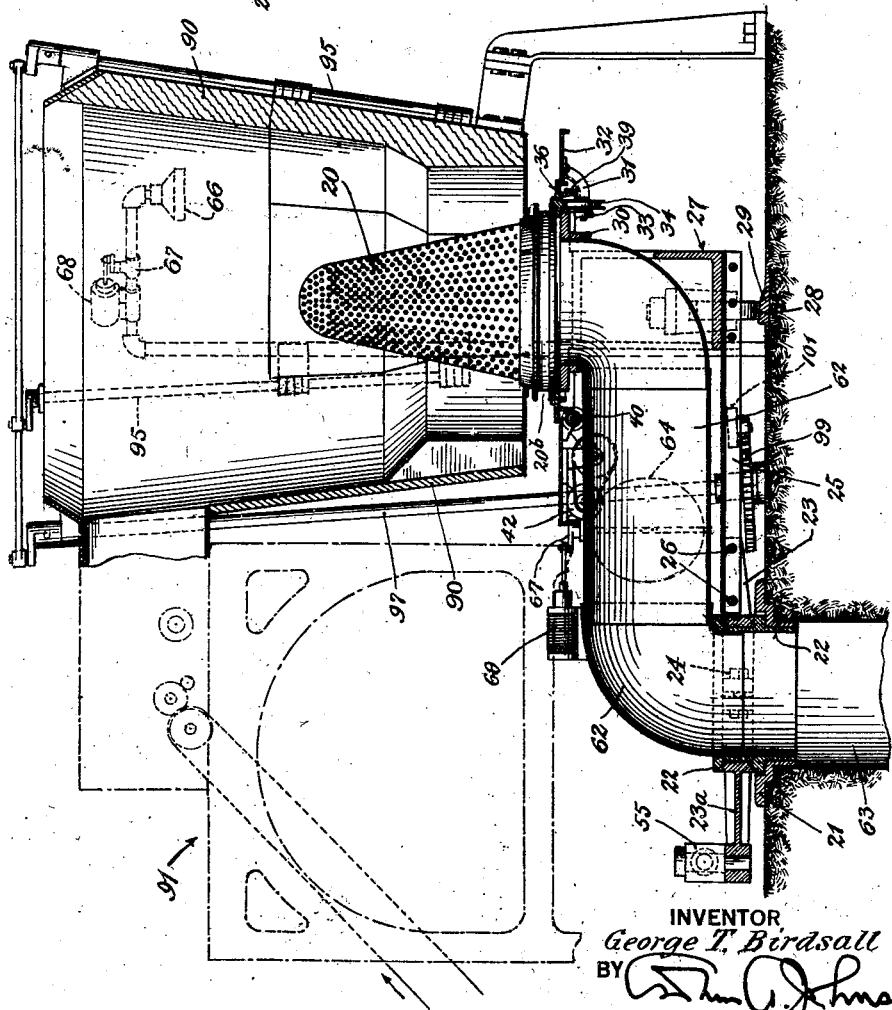
INVENTOR
George T. Birdsall
BY
ATTORNEY

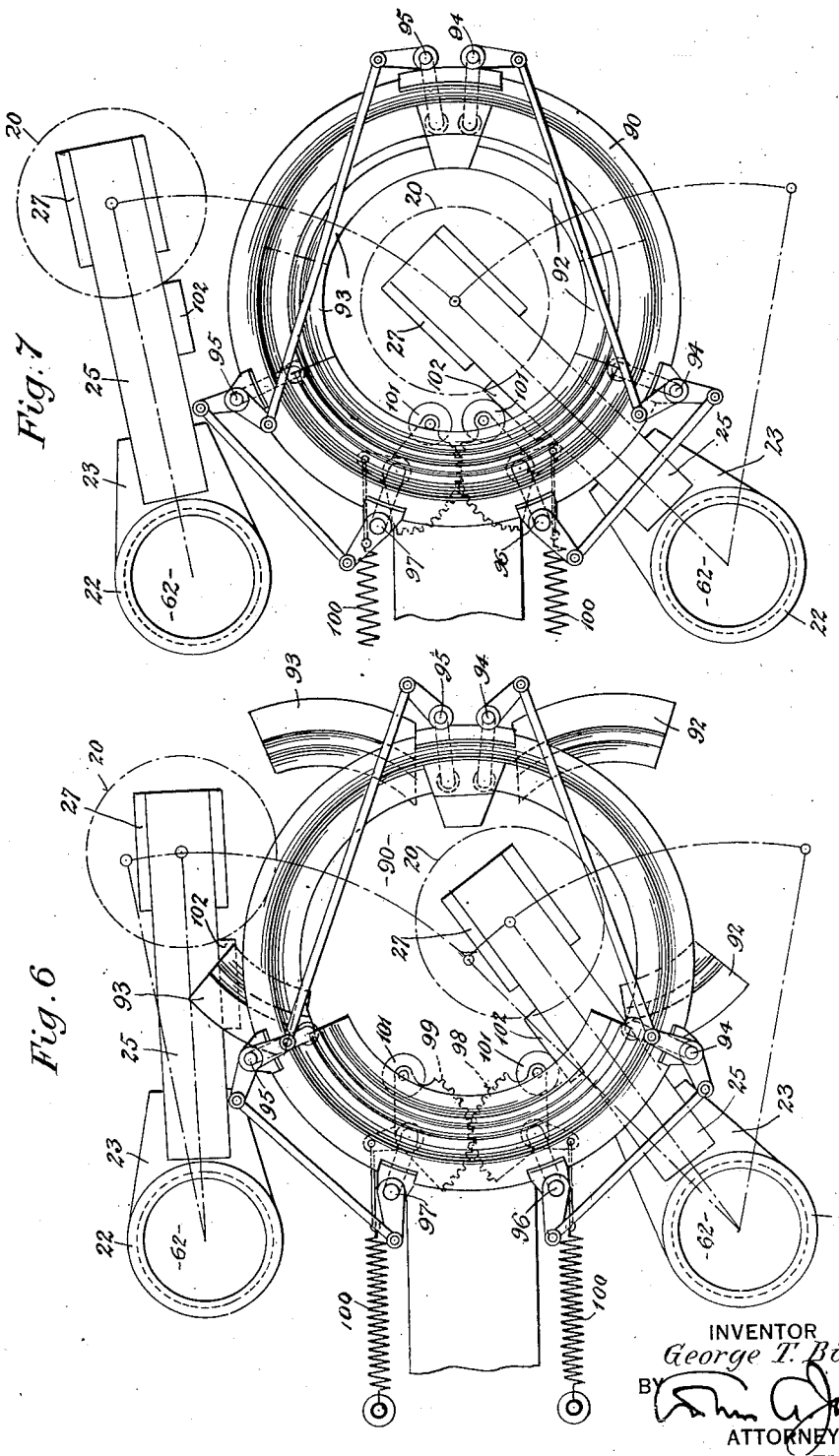

INVENTOR
George T. Birdsall,
BY
ATTORNEY

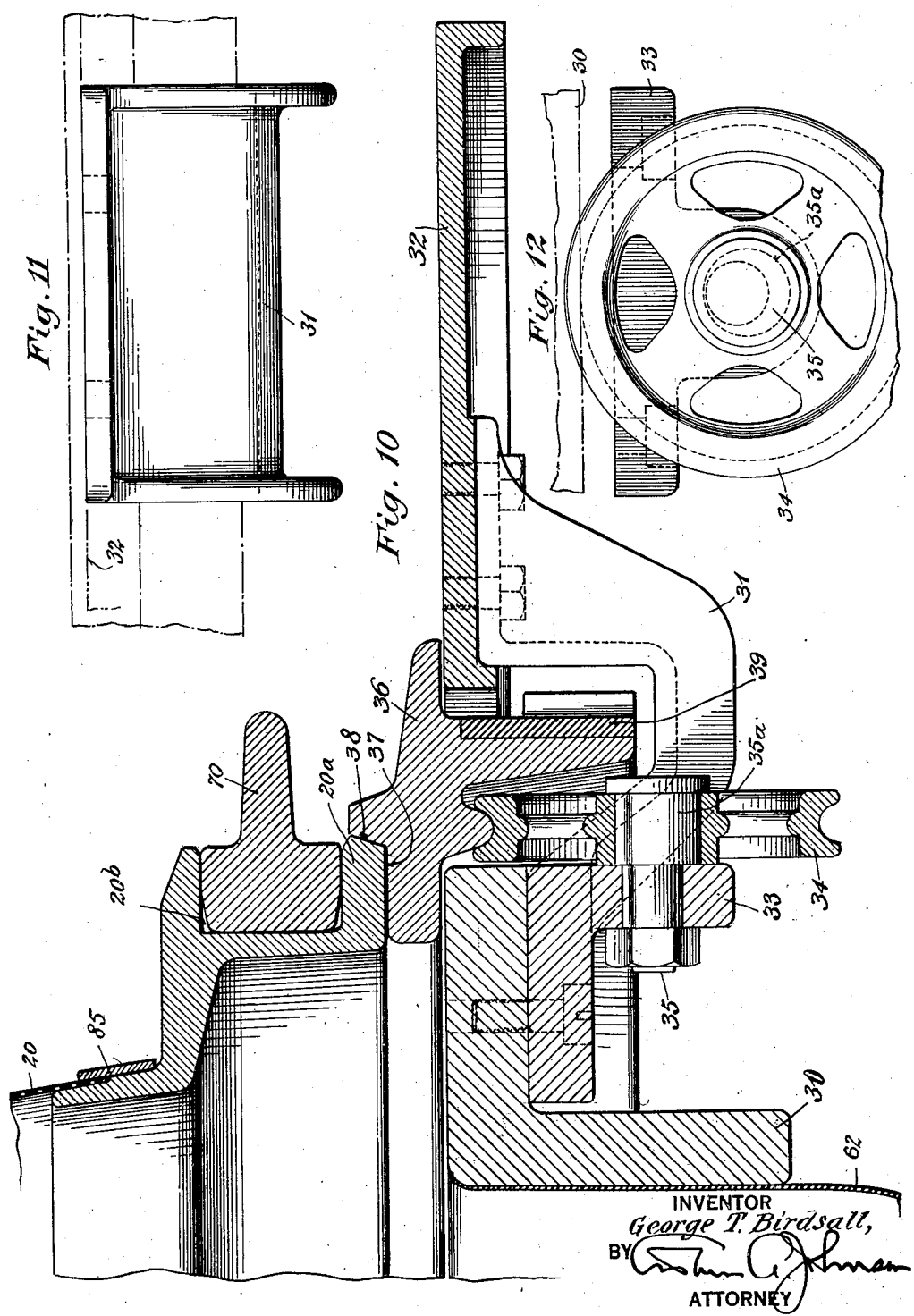

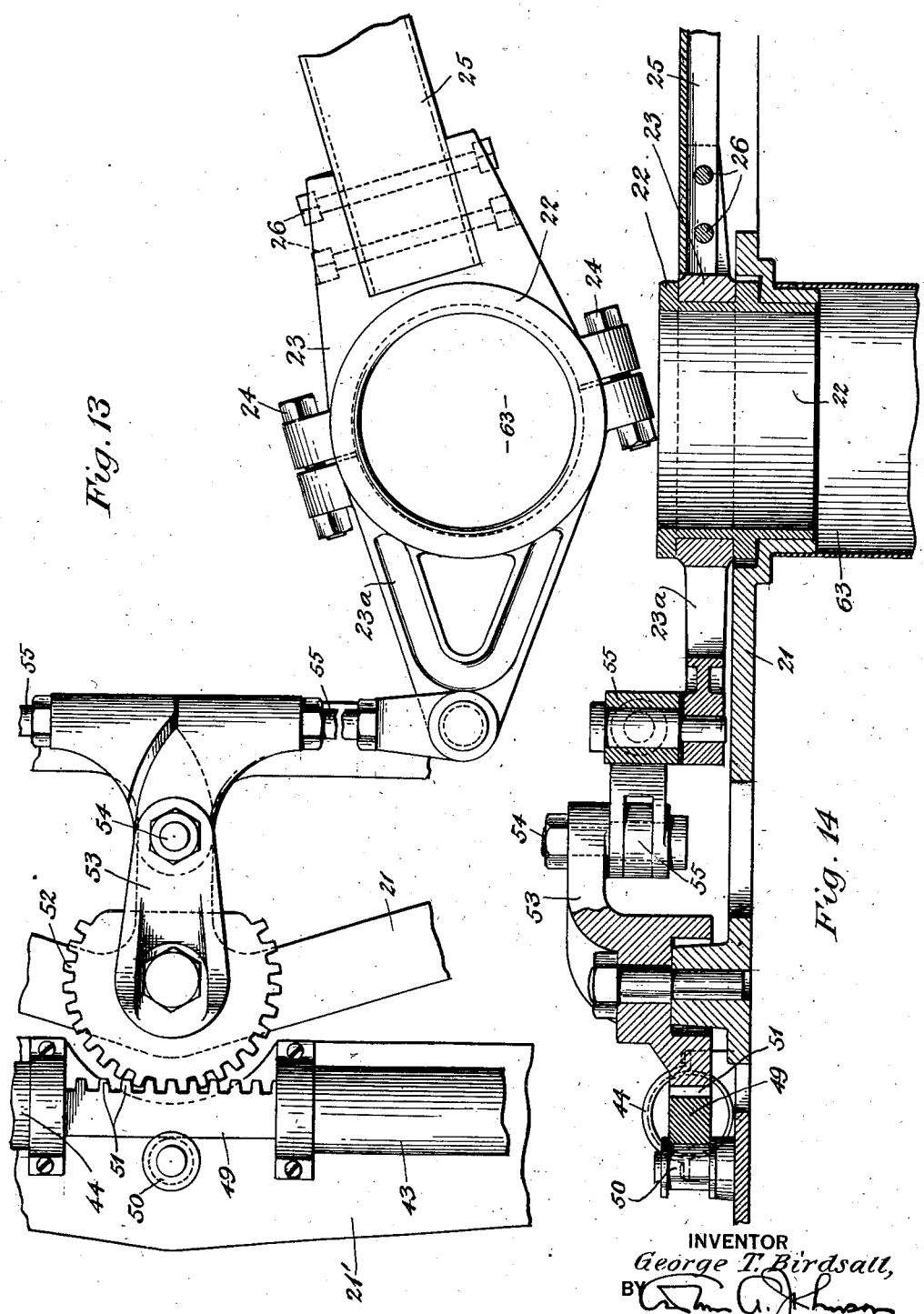

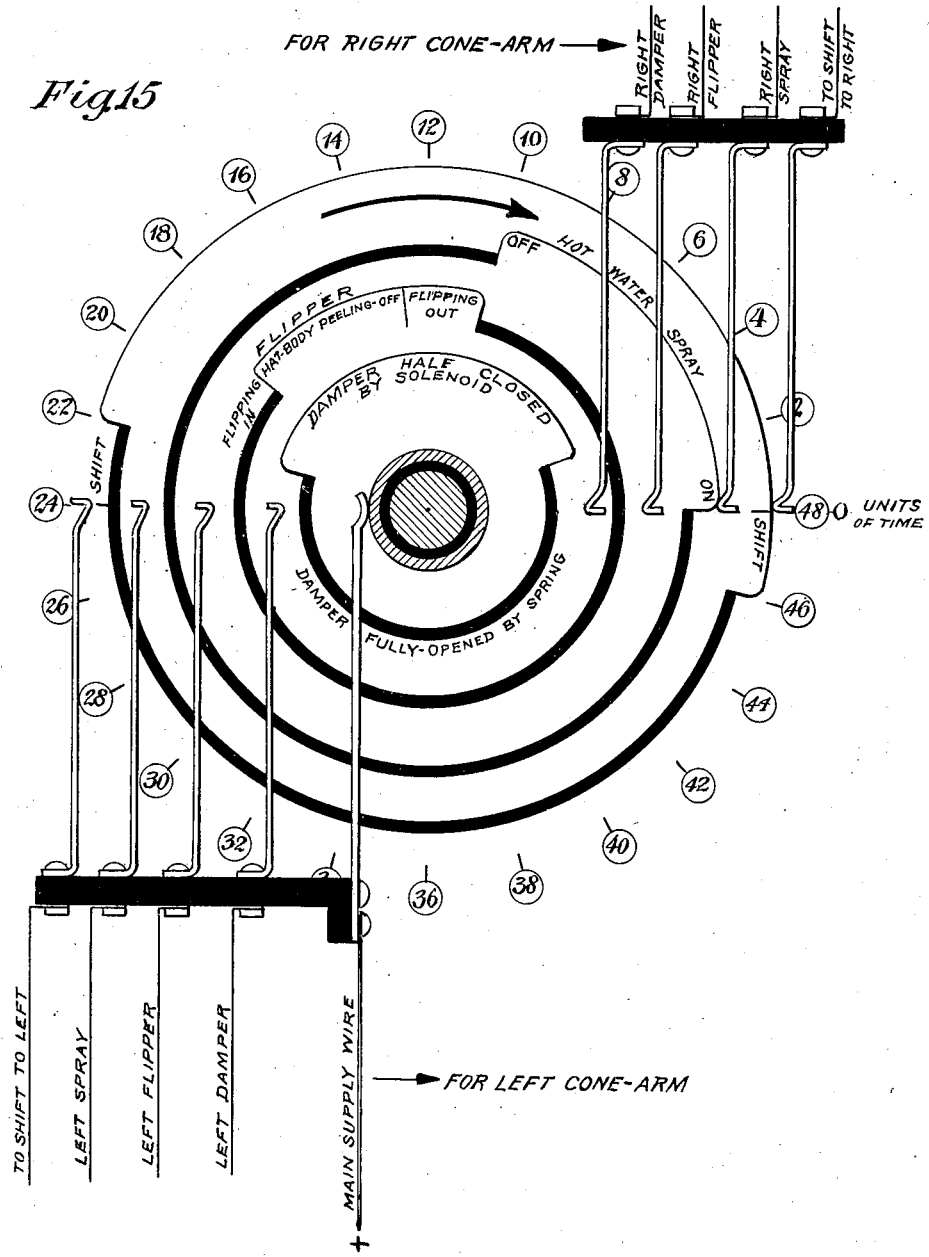

Patented Sept. 12, 1939

2,172,343

UNITED STATES PATENT OFFICE 2,172,343

HAT MAKING MACHINE

George T. Birdsall, Danbury, Conn.

Application November 8, 1937, Serial No. 173,285

25 Claims. (Cl. 19—148)

The invention relates to the manufacture of felt hats.

It has long been the endeavor of the art to produce a machine which will lighten the burden of manual labor involved in making hats, increase the rate of production of hats, and decrease the cost of the same while maintaining or even improving the quality of the article.

According to the present invention, these desires have been fulfilled so far as the first step in making hats, that is the making of the bat, is concerned.

Heretofore, in the art of forming bats, the operator placed a forming cone in a hopper and had to wait until the fur was deposited thereon. After sufficient fur was deposited on the cone, the operator opened the hopper doors and manually moved the cone with the fur thereon from the hopper to a wetting bench. At the wetting bench, the cone with the fur thereon was immersed in a tank of water until the bat was thoroughly wetted. The operator then peeled the bat from the cone and returned the cone to the hopper for the next deposit of the fur. These operations were laborious and involved considerable time, and the hopper was idle while the bat was being wetted and stripped.

The device of the present invention provides two bat-forming cones independently mounted and operable with a common fur-depositing hopper. These cones operate automatically in such a manner that no time is lost in the preparation of the bats. While the fur is being deposited upon one of the cones, the bat on the other cone is being wetted and stripped therefrom so that the cone is ready to move into the hopper at the time that the cone in the hopper is completely deposited with fur. The operations of the machine are completely automatic and do not require the manual labor of an operator for each cone as is the case in the methods in present use. Also, because a plurality of cones are used with a single hopper, a less number of machines is required for producing the same number of hats. However, with the machine of this invention, if one of the cone-carrying units should be disabled, it would not necessitate the stopping of the machine since the other cone-carrying unit, being independent, can continue to operate.

The machine of the present invention includes a means whereby a heavy suction is applied to a cone when it is in fur-depositing position, which suction remains on the cone during its movement from the fur-depositing position to the wetting position and remains on the cone until the sprinkler at the wetting position has had an opportunity to dampen down the cone, at which time the suction is reduced so that it does not suck the water through the fur and the cone but permits it to penetrate gradually so as to compact the bat.

When the bat has been wet, it is automatically stripped from the cone by a novel flipper mechanism which inverts the cone to cause the bat formed thereon to be stripped therefrom. This device engages the cone when it moves into wetting position and is inoperative until after the wetting operation has been completed, at which time it automatically moves the cone through an arc into inverted position so that the bat strips therefrom.

The doors of the hopper of the present invention are arranged to operate in unison and are controlled by the position of the cone-carrying arm when the same moves into the hopper. The doors are normally open and are closed when the cone is moved into the hopper. This arrangement prevents jamming of the cone against the doors.

Other features and advantages will be apparent from the specification taken in connection with the drawings, in which:

Figure 1 is a plan view of the machine.

Fig. 2 is a detail view of the valve mechanism controlling the movement of the cones.

Fig. 3 is a sectional view of the device, taken along the lines 3—3 of Fig. 1.

Fig. 4 is a plan view of the cone-carrying cradle.

Fig. 5 is an end view of the cone-carrying cradle.

Fig. 6 shows a plan view of the hopper with the doors open and the cone-carrying means diagrammatically shown.

Fig. 7 is a view similar to Fig. 6 with the cone in the hopper and the doors closed.

Fig. 10 is a detail section of the supporting means for the cone ring.

Fig. 11 is a front view of the table-supporting bracket.

Fig. 12 is a front view of the pulley showing the means for adjusting the cone-receiving ring.

Fig. 13 is a plan view of the cone-carrying arm actuating mechanism.

Fig. 14 is a sectional view of the mechanism shown in Fig. 13.

Fig. 15 is a detailed showing of the control mechanism.

Figure 8:
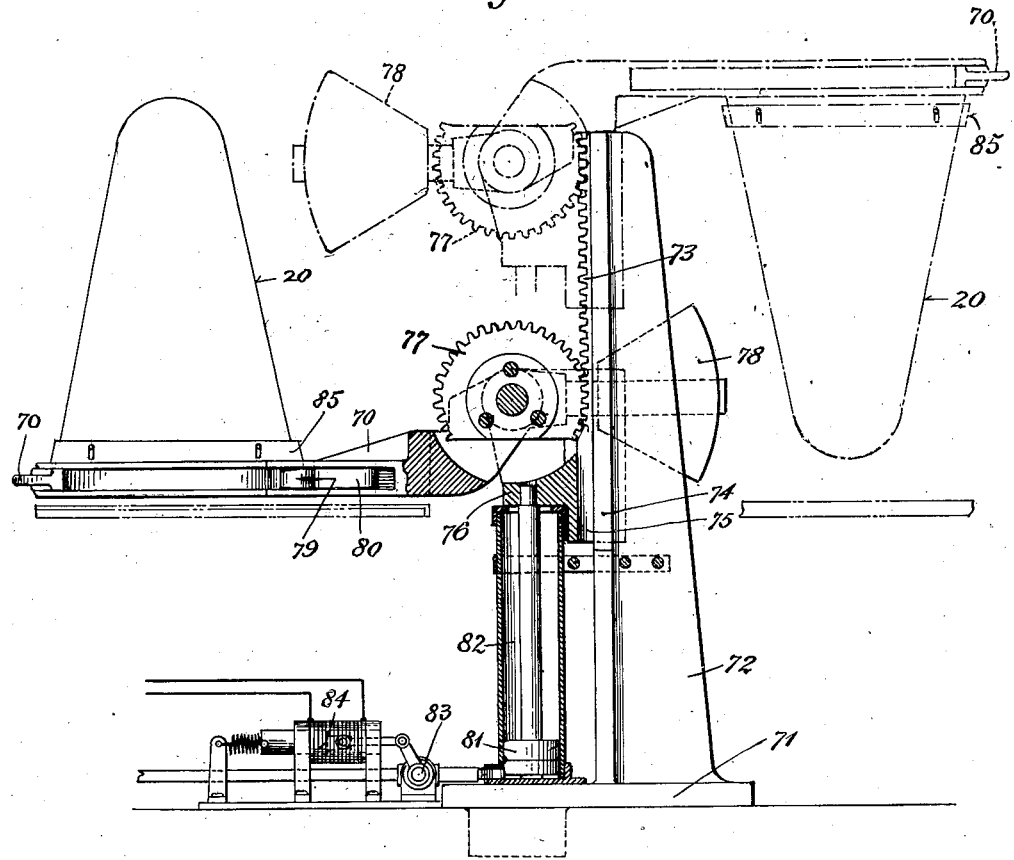
Fig. 8 is a side elevation, partly in section, of the flipping mechanism.

According to the present invention, hat bodies are made on forming cones 20 which are made of perforated metal and have a rounded apex.

While any number of these cones can be used, the present disclosure will be confined to a device having two cones for each machine. These cones are movable alternately into a common hopper to have fur deposited thereon and are then moved to their respective wetting stations to have the bat of fur wetted and then removed therefrom.

According to the present invention, each of the cones is mounted on a separate support which is adapted to be alternately moved about a pivot into the fur-depositing position and the wetting and stripping position. Since the structure of the supporting means is the same for each cone, only one will be described in detail. The support for the cone comprises a base plate 21 having a thimble 22 rotatably mounted therein. A split collar 23 is secured to the thimble by clamping bolts 24 and has a cone-carrying arm 25 bolted to one side thereof by bolts 26. The collar has an arm 23a formed integrally therewith and positioned to extend in a direction opposite to the arm 25. The arm 25 extends outwardly from the collar and has attached at its other end a cone-carrying cradle 27 of substantially U-shape. The cradle is supported by a pair of rollers 28 adapted to run on a track 29 when the cone is moved between the fur-depositing and wetting positions. The cradle has a supporting ring 30 secured to the top thereof. The supporting ring has a set of brackets 31 to which is secured an annular table 32 (see Fig. 10) which extends outwardly therearound. A set of L-shaped brackets 33 are secured to the under surface of the ring. A pulley 34 is mounted on a stud 35 passing through the depending leg of each of the brackets. These pulleys are equally spaced around the ring and support a cone-carrying ring 36 for rotation with respect to table 32. The edge of the cone-carrying ring extends over the edge of the table, as shown in Fig. 10. The upper surface of the cone-carrying ring is provided with a recess 37 having a tapered side 38 which receives the correspondingly shaped base 20a of the cone and securely holds it while at the same time permits it to be readily removed therefrom during the stripping operation.

In making the bat on the cone, the cone is continuously rotated so that the fur is more evenly deposited on it in the fur-depositing position and also so that it will be properly wet in wetting position. In order to rotate the cone, the cone-carrying ring is provided with a ring gear 39 extending therearound which meshes with a worm 40 mounted on the table (see Fig. 1) and driven through a suitable gearing 41 by a motor 42 mounted on the under surface of the table.

To insure free rotation of the cone, the rollers for supporting the cone-receiving ring on the ring secured to the cradle are mounted on eccentric portions 35a of the stud so that by turning the stud the position of the cone-carrying ring can be adjusted with respect to the table so that there will be no interference between the two.

According to the present invention, the cone-carrying arm is moved from depositing to wetting position, about the thimble 22 as a pivot, by a pair of cone-moving cylinders 43, 44 which are connected to a compressed air supply through valve 45. The cylinders have plungers 47 and 48 mounted therein. The plungers are coupled together by a coupling bar 49 so that they move together. A guide roller 50 supports the bar on one side. The coupling bar has a rack 51 formed on the other side which meshes with a gear 52 which has a crank arm 53 formed integrally therewith and having a crank pin 54 adjacent the end thereof. The elements are so arranged that as the cylinders alternately move the coupling bar back and forth the crank pin will move from side-to-side through 180°.

The crank arm is connected by means of connecting rods 55 pivoted on the crank pin 54 and to a pivot pin 56 on the projecting arm 23a secured to the cone-carrying arm so that upon movement of the piston in the cylinder the gear is rotated, moving the crank arm, and, through the connecting rod, moving the cone-carrying arm about the thimble as a pivot so that the cone-carrying arm is moved from one position to the other.

It will be readily seen in Fig. 1, that the arrangement of the connecting rods is such that when one cone is in fur-depositing position, the other cone will be in wetting position, and when the one cone is shifted to wetting position the other automatically moves into fur-depositing position. This reduces to a minimum the time consumed in the bat-forming operation.

The control for the valve for alternately operating the cylinders may take any form, but in the present invention, it consists of a pair of solenoids 57, 58 actuated from the master control of the machine. The valve has a pair of ports which interconnect with the ports in the casing which are connected to the ends of the cylinders to alternately energize one or the other of the cylinders as is shown in Fig. 2. A valve-operating arm 59 is connected to a rod 60 adapted to be moved by the pair of solenoids to move the valve to energize either one or the other of the cylinders. The solenoid remains energized during the time when the arm is in either position so that it will be held against movement by the air pressure. A pair of springs 61 are connected to the valve-actuating arm in such a manner that upon the removal of the energization from the solenoids, the valve will immediately move into a neutral position and stop the operation of the cone-carrying arms. This will prevent operation of the machine, if, for any reason, the current should fail and control should not function.

In order to properly deposit the fur on the cone, it is required that the cone be subjected to a heavy suction during this operation. According to the present invention, each cone is provided with a sheet metal duct 62 which extends from the ring 30 on the carriage to the thimble and moves with the cone-carrying arm. The thimble is connected to a suction fan (not shown) by means of a duct 63 secured to the base as shown in Fig. 3. The duct 62 is provided with a damper 64 which is normally moved into open position by a spring 65 connected to the damper arm 64a. With the damper in its normally open position, a heavy suction will be applied to the cone during the fur-depositing operation. When the cone-moving cylinders are energized to move the cone into the wetting position, the heavy suction is maintained on the cone during movement into the wetting position so that the fur on the cone will be firmly held in place.

When the cone arrives at the wetting station, it moves under a spraying nozzle 66, which, in the present disclosure, is positioned above the cone, but which may be positioned at one side of the cone if desired. A valve 67 for the spray is actuated by a solenoid 68 after the bat is positioned under the nozzle to soak the fur on the cone with boiling water. Soon after the initial operation of the spray, a solenoid 69 mounted on the suction duct is operated to move the damper and decrease the suction on the cone so that the water will not be caused to be sucked quickly through the fur on the cone but will be gradually sucked therethrough so as to compact the fur on the cone.

As the cone moves into the wetting position, the groove 20b in the cone base automatically engages with a hooked flipper arm 70 of the mechanism by which the bat is stripped from the cone after the wetting operation. In moving into engagement with the flipper arm, the cone depresses a latch 79 which is normally pressed outward by a spring 80. The latch holds the cone to the flipper arm against accidental removal but permits it to be moved relative thereto by the cone-carrying arm. The flipper arm has a slight clearance with the cone so that the latter can be freely rotated during the wetting operation.

Figure 9:
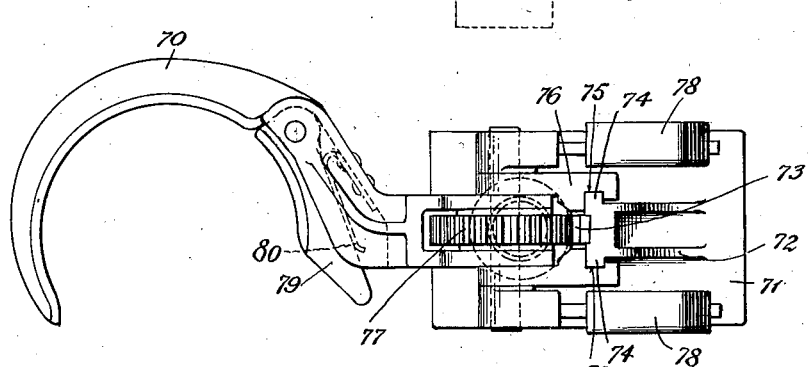
Fig. 9 is a plan view of the flipping mechanism.

The mechanism for moving the flipper arm, which is shown in detail in Figs. 8 and 9, comprises a base 71 mounted on the floor and has a post or vertical support 72 extending upwardly therefrom. The post has a rack 73 secured to one face thereof and is provided with projecting guides or ways 74 adapted to be received in grooves 75 on a carriage 76 adapted to slide along the post. The carriage has a gear 77 rotatably mounted thereon so as to engage with the fixed rack. The gear has secured thereto the flipper arm (which engages the cone) and a pair of counterweights 78.

After the wetting operation is completed, the stripping of the bat is started. The carriage and its flipper arm are moved upwardly along the guides by means of compressed air acting on a piston 81 operating in a cylinder 82. A valve 83 operated by a solenoid 84 which is actuated from the master control regulates the flow of air into the cylinder. As the carriage moves upwardly, the gear will rotate as it moves over the rack and move the flipper arm and cone through an arc to an inverted position. The weight of the cone will be counterbalanced by the pair of weights 78 secured to the carriage opposite the flipper arm. The cone is provided with a starter ring 85 which is positioned around the base of the cone and has a limited movement so that when the cone is flipped into inverted position, the starter ring will slide relative to the cone and start the bat to peel from the cone. After the bat has been started, it will peel off of its own weight.

As will be seen in Fig. 8, the movement given to the cone during this flipping operation will bring the stripped bat on the plane of the table so that an element can be readily positioned for receiving the bat as it falls from the cone.

When the solenoid 84 is deenergized and the air pressure removed from the cylinder 82, the weight of the carriage will return the cone to initial position on the cone-carrying ring.

The mechanism at the fur-depositing station comprises a hopper 90 and the usual mechanism for feeding the fur to the hopper which is indicated at 91 in Fig. 3, by dotted lines, and comprises the usual feed belt and picker rollers. The hopper, according to the present invention, is provided with two openings, through which the two cones pass into and out of fur-depositing position. These openings are closed by pairs of doors 92 and 93 mounted on a substantially vertical axis to be swung by hinge rods 94 and 95. The hinge rods 94 and 95 are interconnected through suitable linkage so that the doors will move open and shut in unison. Each set of doors is connected by suitable linkage to the control rods 96 and 97, which are mounted on the hopper. These control rods have secured at their lower ends a pair of meshing gear segments 98 and 99 and movement of either of the gear segments will move all of the doors together. These gear segments are normally biased by springs 100 to move in the direction to cause the doors on the hopper to open. Each of the gear segments is provided with a roller 101 adapted to contact a contacting block 102 mounted on the cone-carrying arm.

It will be seen from Figs. 6 and 7, that as the cone moves into the hopper the contacting block 102 will engage the roller 101 and cause the doors to be shut during the time the fur is being deposited on the cone. As soon as the cone arm starts to move out of the hopper, the springs will cause the roller to follow the movement of the cone arm and open the doors which will remain open until the other cone arm contacts the other roller and closes the doors.

With this method of control, the doors are normally open and the closing of them is controlled directly by the cone-carrying arm so that the possibility of the cone moving into engagement with the closed doors is removed.

The steps in the operation of the machine, Fig. 1, whereby the machine automatically performs its operations, are controlled from the main controller which comprises a motor 105 geared to drive the controller drum 106 mounted on the shaft 107. The controller drum is provided with a plurality of contacts adapted to engage the contacts 108 and 109 for controlling the operations of each of the cones.

The contacts on the drum and their relation to another is best shown in Fig. 15. The drum as shown is divided into 48 units of time. The unit in actual practice is one second. During one complete operation of the drum, which requires 48 seconds, one cone is furred, wetted, and the bat stripped from the cone and the cone moved back into fur-depositing position. The other cone goes through the same operation with a lag of 24 seconds so that a hat is produced every 24 seconds.

In Fig. 15, considering the right cone arm contacts, the controller has energized the circuit for the cone-moving cylinder to shift the right hand cone from the fur-depositing station to the wetting station and will hold it there for a period of 22 seconds.

As shown, the cone has just reached the wetting station and the contact has been made to turn on the hot water spray. After a period of two seconds, the contact is made to energize the solenoid to close the damper to decrease the suction on the cone. The hot water spray is turned off after 10 seconds and the solenoid for controlling the flipper valve is energized and remains energized during 9 seconds, during which time the flipper moves out and the hat body peels off the cone. The solenoid is then deenergized, and the flipper returns the cone to the cone-carrying ring. The circuit to the solenoid for the cone-moving cylinder is then broken and the solenoid for the other cone-moving cylinder is energized to move the cone into the fur-depositing station where it remains for a period of 22 seconds. The circuit to the solenoid on the damper is also opened at the time the shifting of the cone into the fur-depositing position takes place so that the heavy suction will be applied during the fur-depositing operation.

It will be seen that by displacing the sets of contacts for the two cones by 180°, the operations will be repeated in the same sequence for the other cone which has been moved into its wetting position.

Variations and modifications may be made within the scope of this invention and portions of the improvements may be used without others.

I claim:

1. In a hat making machine, a fur-depositing station; a plurality of forming cones; separate supporting means for each of the cones; a separate wetting station for each of the cones; and means for alternately moving one of the cones from the fur-depositing station to its wetting station while the other is moved from its wetting station to the fur-depositing station.

2. In a hat making machine, a fur-depositing station; a plurality of forming cones; separate supporting means for each of the forming cones; a separate wetting station for each of the forming cones; means for alternately moving the cones into the fur-depositing station and into the wetting station; means for applying a large suction on the cone when in fur-depositing position; and means for reducing the suction after the initiation of the wetting operation.

3. In a hat making machine, a fur-depositing station; a plurality of forming cones; independent supporting means for each of the cones; a separate wetting and removing station for each of the cones; means for alternately moving one of the cones from the fur-depositing station to its wetting and removing station while the other is moved from its wetting station to the fur-depositing station; and means for automatically actuating the wetting means in timed relation to the moving means after the cone is positioned in the wetting station.

4. In a hat making machine, a plurality of forming cones; supporting means for each of the cones; a wetting station for each of the cones having the cone-removing means positioned thereat; means for alternately moving the cone from the fur-depositing station to its wetting station, the movement of the cone into the wetting station causing the cone to be engaged by a removing means; means for wetting the bat deposited on the cone; and means for actuating the removing means after the wetting operation.

5. In a hat making machine, a fur-depositing station; a plurality of forming cones; supporting means for each of the cones; a wetting station for each of the cones; means for applying a large suction to the cone in the depositing station to cause the fur to be drawn thereon; means for moving the cones from the fur-depositing station to their wetting stations, the large suction being maintained on the cones during movement to the wetting station; and means for reducing the suction after the initial wetting operation in the wetting station.

6. In a hat making machine, a fur-depositing station; a plurality of forming cones; separate supporting means for each of the cones; fluid-operated means connected to each of the separate supporting means for moving the supporting means; and valve means operable for controlling the fluid-operated means whereby the cones are alternately moved into the fur-depositing station.

7. In a hat making machine, a fur-depositing station; a plurality of forming cones; supporting means for each of the cones; and fluid-operated means for moving the supporting means whereby the cones are alternately moved into the fur-depositing station; and an electrically operated valve for controlling the fluid-operated means.

8. In a hat making machine, a fur-depositing station comprising a hopper having doors thereon; a plurality of forming cones; supporting means for each of the cones; means for moving the supporting means whereby the cones are alternately moved into the fur-depositing station, and means for automatically moving the doors of the fur-depositing station in accordance with the movement of the cone-supporting means.

9. In a hat making machine, a fur-depositing station comprising a hopper having a plurality of normally open doors; means whereby the doors are operated in unison; a plurality of forming cones; independent supporting means for each of the cones; means for moving the supporting means whereby the cones are alternately moved into the fur-depositing station; and means actuated by the movement of the supporting means for closing the doors when a cone is in the fur-depositing station.

10. In a hat making machine, a forming cone; supporting means for the cone; means for moving the cone into wetting and removing position, movement of the cone into the wetting position causing the cone to be engaged by the removing means; and means actuated after the wetting operation for moving the cone into inverted position whereby the bat formed on the cone will be stripped therefrom.

11. In a hat making machine, a forming cone; supporting means for the cone; means for moving the cone into wetting and removing position, movement of the cone into the wetting position causing the cone to be engaged by the removing means; means actuated after the wetting operation for moving the cone into inverted position whereby the bat formed on the cone will be stripped therefrom, said removing means comprising a vertical support having a fixed rack thereon; a carriage slidable on the support; a gear rotatably mounted on the carriage and engaging the rack; a flipper secured to the gear and adapted to engage the cone; and means for moving the carriage on the frame whereby the gear is rotated and the cone is moved to an inverted position.

12. In a hat making machine, a fur-depositing station; a plurality of forming cones; and separate supporting means for the cones for supporting the cones for movement to and from the fur depositing station, each including a transversely movable cradle; a table secured thereto, and a cone-receiving element rotatably mounted on the table whereby any one of said supporting means can be operated as a unit independently of the condition of the others.

13. In a hat making machine, a fur-depositing station; a plurality of forming cones; independent supporting means for each of the cones pivoted on separate axes; a wetting station for each of the cones; and means for alternately moving the support for one of the cones about its pivot axis from the fur-depositing station to its wetting station while the other support is moved about its pivot axis to move the cone from its wetting station to the fur-depositing station.

14. In a hat making machine, a fur-depositing station; a plurality of forming cones; supporting means for each of the cones; means for moving the supporting means whereby the cones are alternately moved into the fur-depositing station; and independent suction means for each of the cones for controlling a suction as applied to each of the cones.

15. In a hat making machine, a fur-depositing station; a plurality of forming cones; separate supporting means for each of the cones; a wetting station for each of the cones; suction-applying means for each of the cones; and means for alternately moving one of the cones from the fur-depositing station to its wetting station while the other is moved from its wetting station to the fur-depositing station, the suction means for each cone being controllable for that cone and having a damper therein for reducing the suction after the initial wetting operation.

16. In a hat making machine, a fur-depositing station; a plurality of forming cones; and independent supporting means for the cones for supporting the cones for movement to and from the fur depositing station, each including a transversely movable cradle, a table secured thereto, a cone receiving element rotatably mounted on the table, and an individual drive for rotating the cone on the table.

17. In a hat making machine, a fur-depositing station; a plurality of forming cones; and independent supporting means for the cones for supporting the cones for movement to and from the fur depositing station, each including a transversely movable cradle, a table secured thereto, a cone-receiving element rotatably mounted on the table, and adjustable supporting means mounted on the table for receiving the cone-receiving element whereby the position of the cone may be adjusted relative to the table.

18. In a hat making machine, a fur-depositing station including a hopper; a forming cone; means for supporting and moving the cone into and out of the hopper, said hopper including an opening through which the cone can pass, a pair of doors for closing the opening, and means for normally holding the doors in open position; and means actuated by the cone-supporting and moving means for closing the doors when the cone has moved into the hopper.

19. In a hat making machine, a plurality of independent forming cones; fur-depositing means; pivot means in spaced relation with said forming cones and fur-depositing means; and means swingable about the pivot for moving the forming cones and fur-depositing means one relative to the other to alternately associate the forming cones with the fur-depositing means.

20. In a hat making machine, a fur-depositing station; a plurality of forming cones; separate supporting means for each of the forming cones; a separate wetting station for each of the forming cones; and means for alternately moving each of the separate supporting means to carry the cones into the fur-depositing station and into the wetting station.

21. In a hat making machine, a fur-depositing station; a plurality of forming cones; separate supporting means for each of the cones pivoted for swinging movement about separate axes; and means for swinging the supporting means about the pivots whereby the cones are alternately moved into the fur-depositing station.

22. In a hat making machine, a fur-depositing station; a plurality of forming cones; supporting means for each of the cones; separate pivot means for each of the supporting means; and power-operated means for swinging the supporting means about the separate pivot means whereby the cones are alternately moved into the fur-depositing station.

23. In a hat making machine, a fur-depositing station; a plurality of forming cones; supporting means for each of the cones; means for moving the supporting means whereby the cones are alternately moved into the fur-depositing station; independent suction means for each of the cones for controlling a suction as applied to each of the cones; and means for controlling said suction means.

24. In a hat making machine, a forming cone; supporting means for the cone; and means for automatically moving the cone vertically and also through an arc into inverted position whereby the hat on the cone will be stripped therefrom.

25. In a hat making machine, a plurality of forming cones, supporting means for each of said cones; means for depositing fur on said cones, means for causing relative movement between the cones and the depositing means for alternately associating the cones with said means; a wetting means for each cone; suction means for each cone; stripping means for each cone; and control means including a multiple switch having a group of contacts associated with each cone, said contacts operating in predetermined sequence to regulate the wetting means, suction means and stripping means for each cone.

GEORGE T. BIRDSALL.